Nov. 24, 1964   P. DÜTTMANN   3,157,993
STARTER ARRANGEMENT
Filed Nov. 20, 1961   3 Sheets-Sheet 3
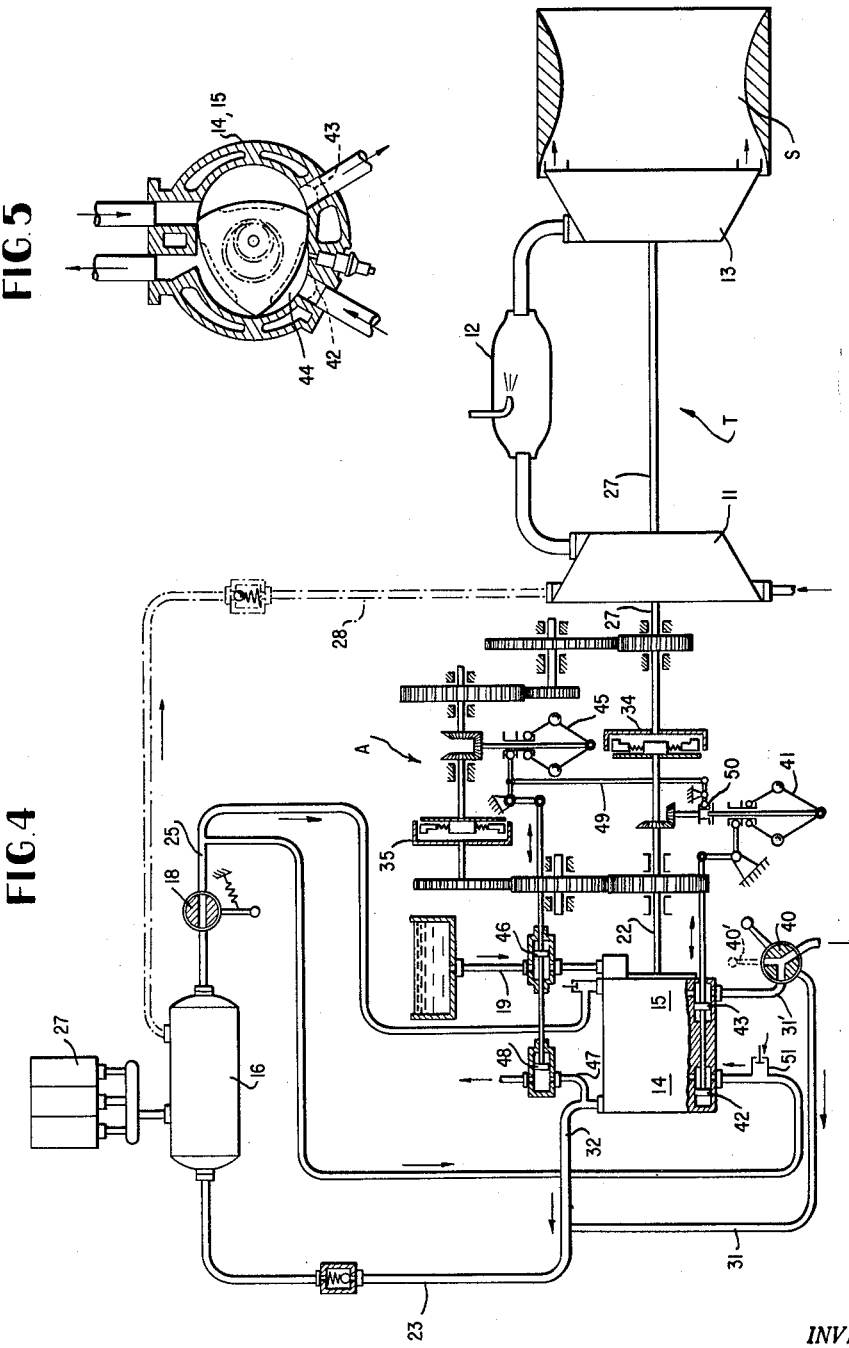
INVENTOR.
PETER DÜTTMANN
BY Dicke and Craig
ATTORNEYS United States Patent Office 3,157,993
Patented Nov. 24, 1964

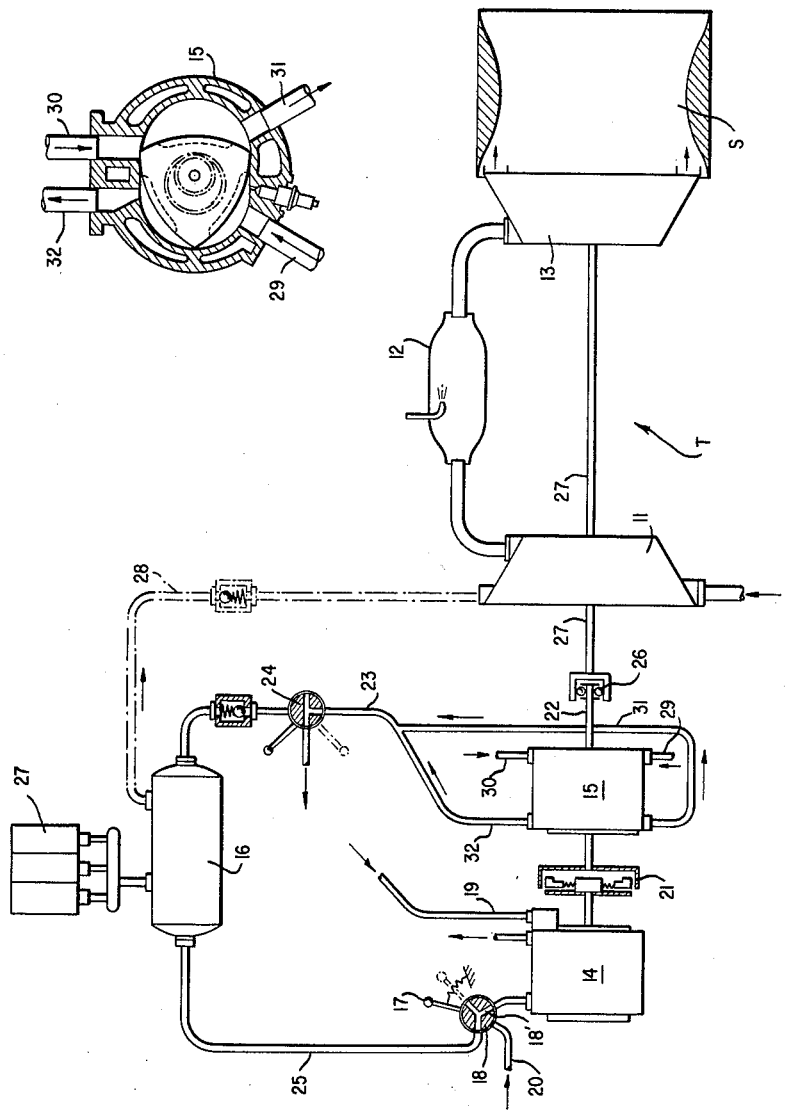

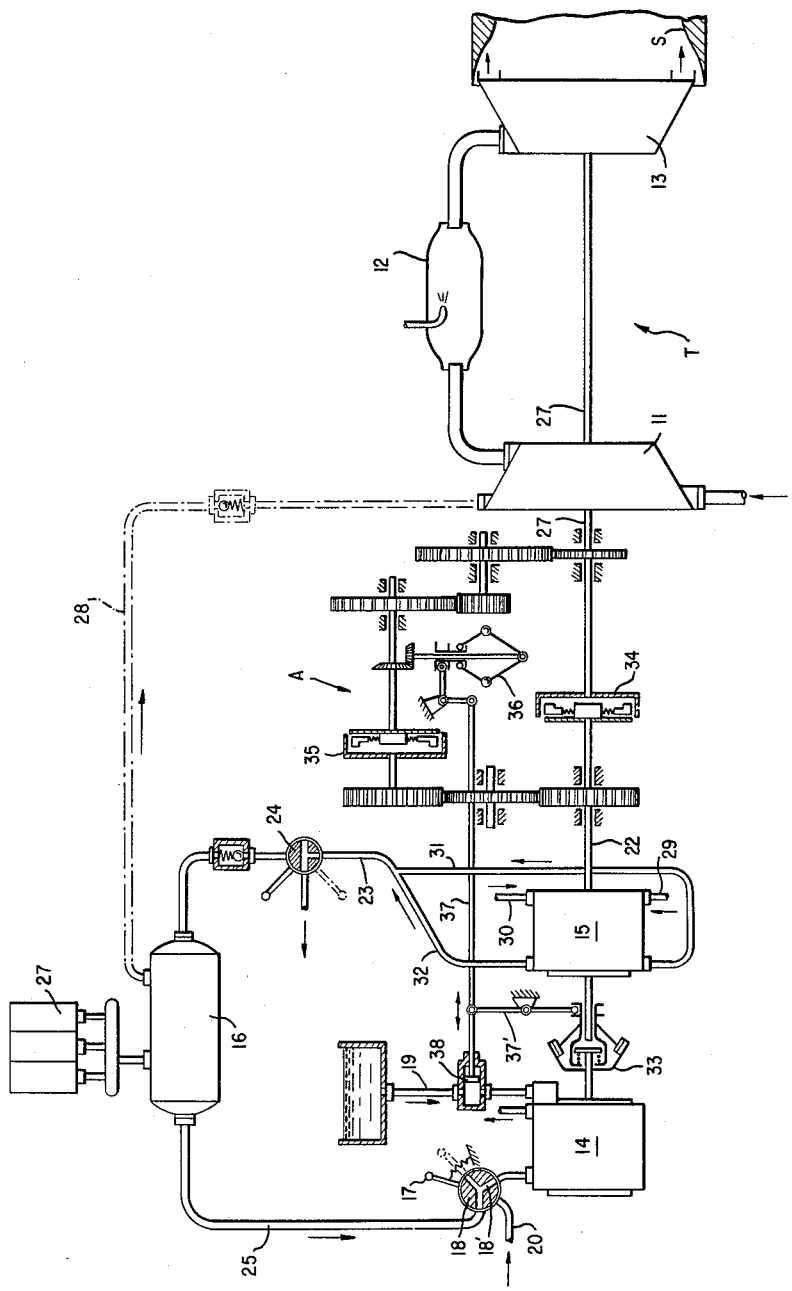

1

3,157,993
STARTER ARRANGEMENT
Peter Düttmann, Rommelshausen, Germany, assignor to Daimler-Benz Aktiengesellschaft, Stuttgart-Unterturkheim, Germany
Filed Nov. 20, 1961, Ser. No. 153,377
Claims priority, application Germany, Nov. 26, 1960
5 Claims. (Cl. 60—39.14)

The present invention relates to a starter arrangement of drive units, and more particularly to a starter arrangement for drive units of airplanes.

The starting of internal combustion engines with large output, especially of drive units installed in airplanes, offers difficulties from many points of view. With airplane drive units, the starter aggregates or starter motors, for the most part, electric motors fed by batteries, form component parts of the drive unit. This has the disadvantage that after the starting operation, the starter motor together with the batteries represent useless dead weight and occupy space in a non-useful manner. In order to avoid such inconvenience, there have been created already mobile starter aggregates usually operating with compressed air which are brought up to the airplane at airports and are operatively connected thereat with the airplane. This, however, entails again the disadvantage that the drive unit, in case of emergency, cannot be started by itself.

As known, the airplane requires during the operation thereof compressed air for different purposes. Thus, the passenger cabins have to be supplied with compressed air at great heights in order to normalize the pressure of the interior space with respect to the harmful underpressure prevailing at great heights. Furthermore, compressed air is required for purposes of cooling the drive unit or in the form of closure air. Additionally, compressed air may be utilized for actuating movable airplane parts such as flaps or for the retraction or lowering of the landing gear or as braking air.

Separate compressors are usually provided for the production of the required compressed air which are driven by the drive unit. Little use is ordinarily made of tapping the compressor in gas turbine drive units because the aerodynamic process thereof is disturbed thereby.

The present invention is concerned with the problem to create an installation for starting the drive unit which responds to the needs of the drive-unit and airplane-constructions in an advantageous manner.

There is proposed in accordance with the present invention as solution to this problem an installation which is characterized by a starter aggregate or a starter motor and a compressed air tank included in a line system the contents of which serve for purposes of starting the starter aggregate or starter motor which, in turn, starts the drive unit and additionally operates in accordance with the present invention during operation of the drive unit as compressed air producer for filling the requirements of compressed air.

According to the present invention, there may be used as starter aggregate a rotary piston motor together with a rotary piston compressor or, in the alternative, a rotary piston motor alone which after starting of the drive unit is changed over and continues to operate as rotary piston compressor. The term "rotary piston" motor or compressor is used herein to designate those rotary piston devices which carry out rotary movements, circular movements or combined rotary and circular movement as, for instance, rotary piston devices of trochoidal construction.

It is realized by the installation in accordance with the present invention that also during the operation of the drive unit, this starter installation is made use of so that the usual, other wise separate compressed air installation is replaced thereby in an advantageous maner.

Accordingly, it is an object of the present invention to provide a starter system, especially for drive units in airplanes which eliminates the disadvantages and shortcomings of the prior art constructions in a simple and reliable manner.

Another object of the present invention resides in the provision of a starter system for drive units, especially for airplanes, which eliminates the waste or useless dead weight and space normally encountered with the existing prior art constructions.

Still another object of the present invention resides in the provision of a starter system for an internal combustion unit which is so constructed and arranged as to permit use of the starter unit as compressor unit after completion of the starting operation of the drive unit so as to make effective use of the starter unit also during normal operation of the drive unit.

Another object of the present invention resides in the provision of a starter system for a drive unit of airplanes which permits starting of the drive unit, in case of emergency, also from within the airplane itself yet eliminates any unnecessary dead weight or wasted space.

These and other objects, features and advantages of the present invention will become more obvious from the following description when taken in connection with the accompanying drawing which shows, for purposes of illustration only, several embodiments in accordance with the present invention, and wherein:

FIGURE 1 is a schematic view of a first embodiment of a starter unit in accordance with the present invention;

FIGURE 2 is a partial cross sectional view through the compressor constructed as rotary piston unit in accordance with the present invention;

FIGURE 3 is a schematic view of a second embodiment of a starter system in accordance with the present invention;

FIGURE 4 is a schematic view of a third embodiment of a starter unit in accordance with the present invention, and FIGURE 5 is a partial cross sectional view, similar to FIGURE 2, of a rotary piston unit used with the starter system of FIGURE 4.

Referring now to the drawing wherein like reference numerals are used throughout the various views to designate corresponding parts, and more particularly to FIGURE 1, reference character T generally disignates therein a gas turbine drive unit which comprises a compressor 11, a combustion chamber 12, a turbine 13 driving the compressor 11 and the thrust nozzle S. The starter installation used with the drive unit T of FIGURE 1 consists primarily of a starter motor 14, preferably of a rotary piston unit, of a compressor 15, also preferably of rotary piston unit and of a compressed air tank 16 which are all interconnected in a line system to be described more fully in connection with the operation of the installation.

The operation of the starter installation of FIGURE 1 is as follows:

If the drive unit T is to be started, then the lever 17 of the rotary slide valve 18 is brought into the position thereof shown in full lines in FIGURE 1. In this position, the compressed air flows from the compressed air tank 16 through the line 25 and the connecting bore 18′ into the starter motor 14 and turns over the latter.

After ignition of the starter motor 14, which is supplied with fuel through line 19, the lever 17 of the rotary slide valve 18 is brought into the position thereof shown in dash line so that now the starter motor 14 draws in fresh air through line 20. As soon as the starter motor 14 reaches a predetermined rotational speed, the centrifugal force clutch 21 engages and drives the rotor of the drive unit T through the compressor 15 and the starter shaft 22. During the starting operation the rotary slide valve 24 installed or built into the compressed air line 23 is so adjusted that the line 23 is open toward the atmosphere so that the compressor 15 practically does not use up any energy, i.e., does not represent any load. A free-wheeling device 26 is arranged between the starter shaft 22 and the compressor drive shaft 27 which permits an overtaking of the shaft 22 by the shaft 27 during the operation of the drive unit T. Inversely, however, the shaft 22 cannot overtake the shaft 27.

After the gas producer 11, 12, 13 of the drive unit T runs by itself, the rotary slide valve 24 is brought with its lever into the position thereof shown in dash line in FIGURE 1. The starter motor 14 now continues to drive the compressor 15 whereby the compressor 15 produces compressed air and fills the compressed air tank 16 which in turn gives off compressed air to the different loads 27. As soon as the compressed air production exceeds the compressed air requirements with certain operation conditions, excess compressed air may be supplied through line 28 to the compressor 11 of the drive unit T.

As illustrated in particular in FIGURE 2, the compressor 15 is constructed as rotary piston unit in which the piston carries out both rotary and circular movements. The rotary piston unit 15 is provided with two inlets 29 and 30 and two compressed air lines 31 and 32 which merge in the common compressed air line 23.

Consequently, according to the embodiment of FIGURE 1, also during the operation of the drive unit T which operates with a very high rotational speed, the compressor 15 continues to be driven by the starter motor 14 which rotates with a considerably lower rotational speed than the drive unit T.

In contradistinction to the embodiment of FIGURE 1, in the embodiment according to FIGURE 3, after termination of the starting operation of the drive unit T during which the engageable and disengageable clutch 33 disposed between the starter motor 14 and the compressor 15 is operative or engaged, the compressor 15 is driven by the compressor shaft 27 through the drive means generally designated by reference character A which by-passes the centrifugal clutch 34. The drive transmission A in which a further centrifugal clutch 35 is provided transmits or converts the relatively high rotational speeds, for example, 30,000 r.p.m. of the gas producer T to a relatively slower rotational speed. The transmission ratio is thereby so selected that the rotational speed, for example, of 4,000 r.p.m. of the compressor 15 during the operation of the drive unit T through the drive transmission A from the shaft 27 is lower than the starting rotational speed, for example, 6,000 r.p.m. of the drive unit T. During the operation of the drive unit T, the fly-weights of the centrifugal clutch 34 no longer engage as a result of a corresponding matching of the springs thereof. Also, the fly-weights of the centrifugal clutch 35 do not engage with the ignition rotational speed, i.e., at the end of the starter operation, by reason of the high speed-reduction transmission of the drive A to a lower rotational speed but engage only when the operational rotational speed of the drive unit T, for example, 30,000 r.p.m., is reached.

A centrifugal governor 36 is operatively connected with the drive transmission A which, upon acceleration of the gas producer, disengages the clutch 33 through a linkage 37, 37' and simultaneously therewith closes or blocks the fuel supply 19 by means of a slide valve 38.

The embodiment illustrated in FIGURES 4 and 5 shows a starter motor and a compressor combined in a rotary piston engine 14, 15 which is adapted to be selectively shifted. For purposes of turning over or starting the rotary piston engine 14, 15 by means of compressed air from the tank 16, the rotary slide valve 18 is again moved into the position thereof shown in full line in FIGURE 4. Also, a rotary slide valve 40 is moved into a position thereof in which it temporarily connects the line 31' with the atmosphere, in order to achieve temporarily a decompression within the combustion space of the rotary piston unit. As soon as the rotary piston engine 14, 15 reaches the idling speed thereof, it is ignited. After ignition thereof, the compressed air line 25 is closed by the starting slide valve 18 and simultaneously therewith the piston slide valves 42 and 43, controlled by the centrifugal goveror 41, seal off the combustion space 44 (FIGURE 5) of the rotary piston engine against the atmosphere so that the rotary piston engine automatically continues to operate as starter motor and turns over or starts through the centrifugal clutch 34, which only now becomes operative, the gas producer of the drive unit T which reaches approximately at 6,000 r.p.m. its idling rotational speed and now in turn is ignited. Following this operation, the rotational speed of the gas producer increases up to the operational rotational speed thereof, for example, up to 30,000 r.p.m. whereby a centrifugal governor 45 closes by means of a piston slide valve 46 the fuel supply to the rotary piston engine through line 19 and simultaneously therewith also closes the exhaust line 47 by means of a further piston slide valve 48. Additionally, a clutch 50 in the drive shaft of the centrifugal governor 41 is disengaged by the centrifugal governor 45 over a linkage 49 so that the compressed air supply line 31' and the suction line 51 are again opened. The rotary piston engine 14, 15 now operates as compressor, fills the compressed air tank 16 through lines 31, 32 and 23 and covers the compressed air supply of the individual loads 27 whereby the lever 40' of the rotary slide valve 40 is brought into the position thereof shown in dash line in FIGURE 4 so that now the compressed air tank 16 is operatively connected through line 31 with the engine 14, 15.

While I have shown and described several embodiments in accordance with the present invention, it is understood that the same is not limited thereto, but is susceptible of many changes and modifications within the spirit and scope thereof. For example, the present invention is not limited to gas turbine drive units but may also be used with piston internal combustion engines or other drive or power machines.

Thus, it is obvious that the present invention is susceptible of many modifications and changes within the spirit and scope thereof, and I therefore, do not wish to be limited to the details shown and described herein, but intend to cover all such changes and modifications as are encompassed by the scope of the appended claims.

I claim:

1. A starter system for starting a drive unit, especially for airplanes, comprising rotary piston starter means effectively providing a starter motor with a suction line as well as a compressor, compressed air tank means, line means operatively connecting said starter means with said compressed air tank means for starting said starter means by the contents of said compressed air tank means including valve means in said suction line operatively connecting said starter motor during starting thereof with said air tank means and operatively connecting said starter motor with the atmosphere during starting of said drive unit, means operatively connecting said starter means with said drive unit to start the latter by the former, and speed-responsive means for rendering said starter means operative as compressed air producer means during operation of said drive unit to cover the compressed air needs of the installation.

2. A starter system for starting drive units, especially for airplanes, comprising starter means including a starter motor and a compressor combined in a shiftable rotary piston unit which is operative during turning over thereof as compressed air motor, during starting of said drive unit as internal combustion engine and during operation of said drive unit as compressor, compressed air tank means, line means operatively connecting said starter means with said compressed air tank means for starting said starter means by the contents of said compressed air tank means, means operatively connecting said starter means with said drive unit to start the latter by the former, and means for rendering said starter means operative as compressed air producer means during operation of said drive unit to cover the compressed air needs of the installation.

3. A starter system for starting drive units, especially for airplanes, comprising starter means including a starter motor and a compressor combined in a shiftable rotary piston unit which is operative during turning over thereof as compressed air motor, during starting of said drive unit as internal combustion engine and during operation of said drive unit as compressor, compressed air tank means, line means operatively connecting said starter means with said compressed air tank means for starting said starter means by the contents of said compressed air tank means, means operatively connecting said starter means with said drive unit to start the latter by the former, and means for rendering said starter means operative as compressed air producer means during operation of said drive unit to cover the compressed air needs of the installation, said rotary piston unit being provided with a first suction line and a first exhaust line and within the area of the combustion space with a second suction line and with a second exhaust line leading to said air tank means, centrifugally actuated control means including valve means for selectively controlling said second suction and exhaust lines in such a manner that during operation of said drive unit said last-mentioned lines are opened and during starting thereof are closed directly outside of said combustion space.

4. A starter system for starting drive units, especially for airplanes, comprising starter means including a starter motor and a compressor combined in a shiftable rotary piston unit which is operative during turning over thereof as compressed air motor, during starting of said drive unit as internal combustion engine and during operation of said drive unit as compressor, compressed air tank means, line means operatively connecting said starter means with said compressed air tank means for starting said starter means by the contents of said compressed air tank means, means operatively connecting said starter means with said drive unit to start the latter by the former, and means for rendering said starter means operative as compressed air producer means during operation of said drive unit to cover the compressed air needs of the installation, said rotary piston unit being provided with a first suction line and a first exhaust line and within the area of the combustion space with a second suction line and with a second exhaust line leading to said air tank means, centrifugally actuated control means including valve means for selectively controlling said second suction and exhaust lines in such a manner that during operation of said drive unit said last-mentioned lines are opened and during starting thereof are closed directly outside of said combustion space, the line of said line means leading from said starter means to said air tank means being provided with an exhaust branch line, and control means for controlling said exhaust branch line in such a manner that during turning over of said starter means said exhaust branch line is supplied with compressed air and during starting of said drive unit, when said starter means operates as internal combustion engine, said exhaust branch line is in communication with the atmosphere whereas during production of compressed air and said exhaust branch line is effectively closed.

5. A starter system for starting drive units, especially for airplanes, comprising starter means including a starter motor and a compressor combined in a shiftable rotary piston unit which is operative during turning over thereof as compressed air motor, during starting of said drive unit as internal combustion engine and during operation of said drive unit as compressor, compressed air tank means, line means operatively connecting said starter means with said compressed air tank means for starting said starter means by the contents of said compressed air tank means, means operatively connecting said starter means with said drive unit to start the latter by the former, and means for rendering said starter means operative as compressed air producer means during operation of said drive unit to cover the compressed air needs of the installation, the line of said line means leading from said starter means to said air tank means being provided with an exhaust branch line, and control means for controlling said exhaust branch line in such a manner that during turning over of said starter means said exhaust branch line is supplied with compressed air and during starting of said drive unit, when said starter means operates as internal combustion engine, said exhaust branch line is in communication with the atmosphere whereas during production of compressed air said exhaust branch line is effectively closed.

References Cited in the file of this patent

UNITED STATES PATENTS

| | | |
|---|---|---|
| 1,013,528 | Broderick | Jan. 2, 1912 |
| 1,320,676 | Davis | Nov. 4, 1919 |
| 1,329,152 | Vleck | Jan. 27, 1920 |
| 2,032,025 | Nardone | Feb. 25, 1936 |

FOREIGN PATENTS

| | | |
|---|---|---|
| 349,005 | Germany | Feb. 20, 1922 |
| 798,704 | Great Britain | July 23, 1958 |